US009121701B2

(12) United States Patent
Shaw et al.

(10) Patent No.: US 9,121,701 B2
(45) Date of Patent: Sep. 1, 2015

(54) FIBER OPTICALLY COUPLED LASER RANGEFINDER FOR USE IN A GIMBAL SYSTEMS

(75) Inventors: William E. Shaw, Marlborough, MA (US); Bruce Whaley, Freehold, NJ (US); Marcus Hatch, Waltham, MA (US); Raymond J. Silva, Saugus, MA (US); Michael E. DeFlumere, Woburn, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/883,183

(22) PCT Filed: Aug. 21, 2012

(86) PCT No.: PCT/US2012/051648
§ 371 (c)(1),
(2), (4) Date: May 2, 2013

(87) PCT Pub. No.: WO2013/028649
PCT Pub. Date: Feb. 28, 2013

(65) Prior Publication Data
US 2013/0222784 A1    Aug. 29, 2013

Related U.S. Application Data

(60) Provisional application No. 61/526,477, filed on Aug. 23, 2011.

(51) Int. Cl.
*G01C 3/08* (2006.01)
*G01C 3/02* (2006.01)
(Continued)

(52) U.S. Cl.
CPC ............... *G01C 3/02* (2013.01); *G01S 7/4811* (2013.01); *G01S 7/4818* (2013.01); *G01S 17/08* (2013.01)

(58) Field of Classification Search
CPC ............ G01C 3/08; G01C 3/04; G01S 17/89; G01S 7/4817; G01S 17/42; G01S 15/002; F41G 3/06
USPC .................. 356/4.01, 4.07, 5.01, 5.09, 9, 625
See application file for complete search history.

(56) References Cited

U.S. PATENT DOCUMENTS 4,678,333 A * 7/1987 Anderson ................. 356/451
5,050,986 A    9/1991 Gatto et al.
(Continued)

FOREIGN PATENT DOCUMENTS

EP    638824 B1    1/2008

OTHER PUBLICATIONS

Goel, Development of "Core-Suction" Technique for Fabrication of Highly Doped Fibers for Optical Amplification and Characterizalion of Optical Fibers for Raman Amplification. 2005_Virginia Polytechnic Institute and State Universily. {retrieved on Oct. 17, 2012}. Retrieved from ProQuest Disertations and Theses: /search.proquest. comt docview/3054.*
(Continued)

*Primary Examiner* — Isam Alsomiri
*Assistant Examiner* — Samantha K Abraham
(74) *Attorney, Agent, or Firm* — Daniel J. Long; Prakash Nama

(57) ABSTRACT

A fiber optically coupled laser rangefinder (LRF) for use in a gimbal system to input/extract a laser beam into/from a camera is disclosed. In one embodiment, the fiber optically coupled LRF includes a gimbal assembly. Further, the gimbal assembly includes a first fiber optic cable for receiving the laser beam from a remote transmitter assembly, a fiber optically coupled laser interface module to receive the laser beam and opposing mirrors to direct the laser beam to a target. In addition, the gimbal assembly includes a second fiber optic cable for transmitting a return laser beam to a remote receiver assembly. The opposing mirrors are further configured to direct the return laser beam from the target to the fiber optically coupled laser interface module. The fiber optically coupled laser interface module is further configured to transmit it to the receiver assembly via the second fiber optic cable.

13 Claims, 3 Drawing Sheets

(51) Int. Cl.
*G01S 17/08* (2006.01)
*G01S 7/481* (2006.01)

(56) References Cited

U.S. PATENT DOCUMENTS

| | | | |
|---|---|---|---|
| 5,319,434 | A | 6/1994 | Croteau et al. |
| 6,252,544 | B1 | 6/2001 | Hoffberg |
| 8,194,126 | B2 * | 6/2012 | David et al. .................. 348/139 |
| 2004/0114152 | A1 * | 6/2004 | Hill et al. ...................... 356/498 |
| 2005/0001168 | A1 | 1/2005 | Amon et al. |
| 2005/0200831 | A1 | 9/2005 | Staley, III et al. |
| 2006/0066836 | A1 | 3/2006 | Bridges et al. |
| 2006/0072020 | A1 | 4/2006 | McCutchen |
| 2010/0128243 | A1 * | 5/2010 | Liebman et al. .................. 356/3 |
| 2010/0288942 | A1 * | 11/2010 | Van Dijk et al. ........... 250/458.1 |
| 2011/0268453 | A1 * | 11/2011 | Fest et al. ...................... 398/129 |

OTHER PUBLICATIONS

Polley. High performance multimode fiber systems: A comprehensive approach. 2009. Georgia Institute of Technology. [retrieved on Oct. 17, 2012]. Retrieved from ProQuest Diserlations and Theses: tsearch.proquest.comIdocview/3048894401139D6A1022A77ED6 E8A/1 ?accountid+142944>. abstract.*

Goel, Development of "Core-Suction" Technique for Fabrication of Highly Doped Fibers for Optical Amplification and Characterization of Optical Fibers for Raman Amplification. 2005. Virginia Polytechnic Institute and State University. {retrieved on Oct. 17, 2012}. Retrieved from ProQuest Disertations and Theses: <http://search.proquest.com/docview/3054 13328/abstract/ 139D69E70057DA332951/1?accountid=142944>?. abstract.

Polley. High performance multimode fiber systems: A comprehensive approach. 2009. Georgia Institute of Technology. [retrieved on Oct. 17, 2012]. Retrieved from ProQuest Disertations and Theses: <http://search.proquest.com/docview/304889440/ 139D6A1022A77ED6E8A/1?accountid+142944>. abstract.

* cited by examiner

FIBER OPTICALLY COUPLED LASER RANGEFINDER FOR USE IN A GIMBAL SYSTEMS

CROSS-REFERENCE TO RELATED APPLICATION

This Application claims rights under 35 USC §119(e) from U.S. Application 61/526,477 filed Aug. 23, 2011, the contents of which are incorporated herein by reference.

BACKGROUND OF THE INVENTION

1. Field of the Invention

The present invention relates to laser rangefinders (LRFs), more specifically to fiber optically coupled LRFs.

2. Brief Description of Related Art

Currently, a laser rangefinder (LRF) combined with a camera, of any waveband, mounted on a gimbal assembly is used to view and measure a range to objects within a system field of regard. However, the weight and size of the LRF dramatically increases the size of the gimbal assembly. This is due to the scaling that occurs as the structure, motors, drive power, drive electronics and support requirements of the gimbal assembly increase to accommodate the LRF. This increased size of the gimbal assembly increases a swept volume in a sensor package and thereby increasing the overall size and weight of the gimbal assembly.

Further, having the LRF in the gimbal assembly couples the waste heat (typically, lasers are at best 30% efficient) into the structure that combines a camera optical bench in the gimbal assembly. This heat load may cause boresight and optical distortions that can degrade the overall system performance. Further, if mirrors are used to couple the LRF onto the gimbal assembly then the heat problem can be averted but the gimbal assembly complexity and size may increase. Generally, the gimbal assemblies have two to three axes of motions and each axis of motion requires a set of mirrors with their accompanied alignment, limited field, of view and transmission losses.

SUMMARY OF THE INVENTION

A fiber optically coupled laser rangefinder (LRF) for use in a gimbal system is disclosed. According to one aspect of the present subject matter, the fiber optically coupled LRF includes a gimbal assembly. Further, the gimbal assembly includes a first fiber optic cable for receiving a laser beam from a remote transmitter assembly, a second fiber optic cable for transmitting a return laser beam to a remote receiver assembly, a fiber optically coupled laser interface module and a plurality of opposing mirrors.

In operation, the fiber optically coupled laser interface module is configured to receive the laser beam from the first fiber optic cable. Further, the opposing mirrors are configured to direct the laser beam from the fiber optically coupled laser interface module to a target. Furthermore, the opposing mirrors are configured to direct the return laser beam from the target to the fiber optically coupled laser interface module. In addition, the fiber optically coupled laser interface module is configured to transmit the return laser beam to the receiver assembly via the second fiber optic cable.

According to another aspect of the present subject matter, a LRF system includes the transmitter assembly, receiver assembly, and gimbal assembly. Further, the gimbal includes the first fiber optic cable for receiving the laser beam from the transmitter assembly, second fiber optic cable for transmitting the return laser beam to the receiver assembly, the fiber optically coupled laser interface module, and the opposing mirrors.

In operation, the fiber optically coupled laser interface module is configured to receive the laser beam from the first fiber optic cable. Further, the opposing mirrors are configured to direct the laser beam from the fiber optically coupled laser interface module to a target. Furthermore, the opposing mirrors are configured to direct the return laser beam from the target to the fiber optically coupled laser interface module. In addition, the fiber optically coupled laser interface module is configured to transmit the return laser beam to the receiver assembly via the second fiber optic cable.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

Figure 1:
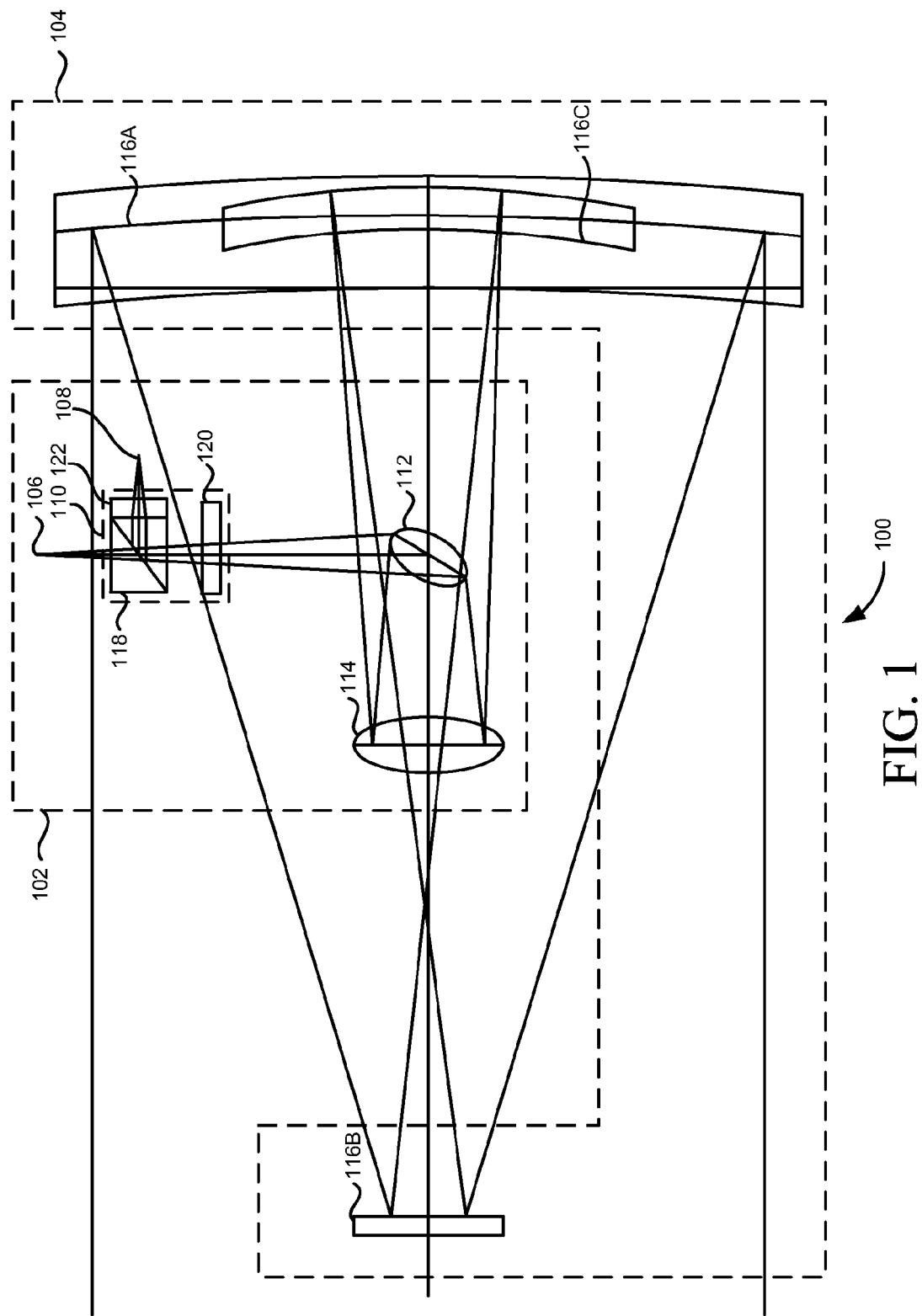
FIG. 1 is a schematic of an example implementation of a laser rangefinder (LRF) and a camera telescope optic layout.

FIG. 1 is a schematic 100 of an example implementation of a laser rangefinder (LRF) and a camera telescope optic layout. As shown in FIG. 1, the schematic 100 includes a fiber optically coupled laser interface module 102 and a plurality of opposing mirrors 104. Further, the opposing mirrors 104 include a primary mirror 116A, a secondary mirror 116B, and a tertiary mirror 116C. Furthermore, the fiber optically coupled laser interface module 102 includes a polarizing input/output device 110, a fold mirror 112, and a dichroic beam splitter 114. In addition, the polarizing input/output device 110 includes a beam splitter cube 118, a quarter wave plate 120 and a narrow band pass optical filter 122.

Figure 2:
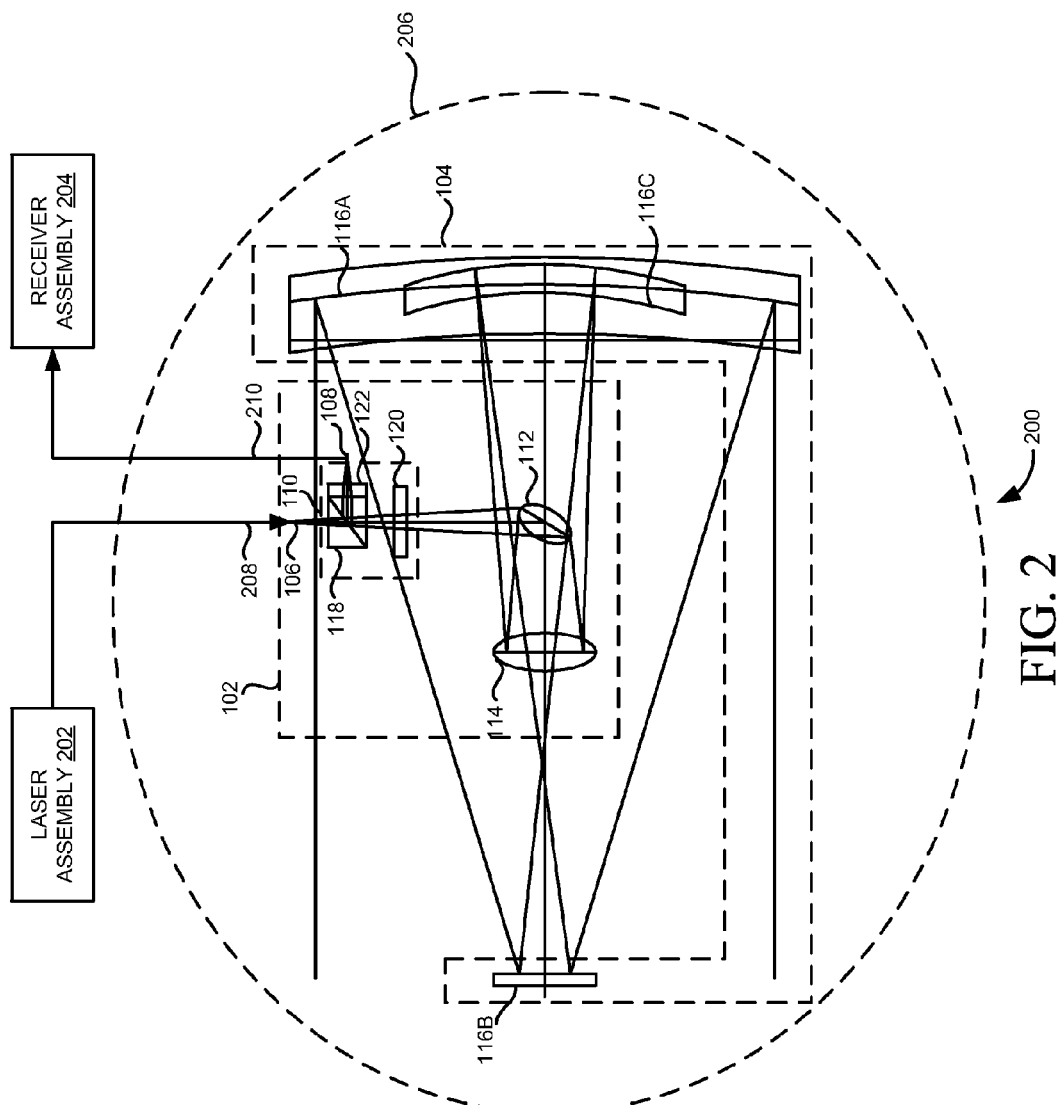
FIG. 2 illustrates a block diagram of a LRF system, according to an embodiment of the present subject matter.

In operation, the fiber optically coupled laser interface module 102 is configured to receive a laser beam 106 from a remote transmitter assembly (e.g., a remote transmitter assembly 202 of FIG. 2) via a first fiber optic cable (e.g., a first fiber optic cable 208 of FIG. 2). Further, the opposing mirrors 104 are configured to direct the laser beam 106 from the fiber optically coupled laser interface module 102 to a target. For example, the target includes a camera telescope and the like. Furthermore, the opposing mirrors 104 are configured to direct a return laser beam 108 from the target to the fiber optically coupled laser interface module 102. In addition, the fiber optically coupled laser interface module 102 is configured to transmit the return laser beam 108 to a remote receiver assembly (e.g., a remote receiver assembly 204 of FIG. 2) via a second fiber optic cable (e.g., a second fiber optic cable 210 of FIG. 2). This is explained in more detail with reference to FIG. 2.

FIG. 2 is a block diagram that illustrates a LRF system 200, according to an embodiment of the present subject matter. As shown in FIG. 2, the LRF system 200 includes a remote transmitter assembly 202, a remote receiver assembly 204, and a gimbal assembly 206. Further, the gimbal assembly 206 includes a first fiber optic cable 208 for receiving the laser beam 106 from the transmitter assembly 202, a second fiber optic cable 210 for transmitting the return laser beam 108 to the receiver assembly 204, the fiber optically coupled laser interface module 102, and the opposing mirrors 104. For example, the first fiber optic cable 208 is a 11 micrometer (μm) fiber optic cable. For example, the second fiber optic cable 210 is a 62 μm fiber optic cable.

Furthermore, the opposing mirrors 104 include the primary mirror 116A, the secondary mirror 116B, and the tertiary mirror 116C. In addition, the fiber optically coupled laser interface module 102 includes the polarizing input/output device 110, the fold mirror 112, and the dichroic beam splitter 114. Moreover, the polarizing input/output device 110 includes the beam splitter cube 118, the quarter wave plate 120 and the narrow band pass optical filter 122.

In operation, the transmitter assembly 202 produces the laser beam 106 and directs the produced laser beam 106 to the fiber optically coupled laser interface module 102 via the first fiber optic cable 208. Further, the fiber optically coupled laser interface module 102 is configured to receive the laser beam 106 from the first fiber optic cable 208. Particularly, the polarizing input/output device 110 is configured to receive the laser beam 106 from the first fiber optic cable 208. In one exemplary implementation, the beam splitter cube 118 is configured to receive the laser beam 106 from the first fiber optic cable 208 and linearly polarize the received laser beam 106. The quarter wave plate 120 is then configured to receive the linearly polarized laser beam from the beam splitter cube 118 and to convert the linearly polarized laser beam to a circularly polarized laser beam and direct it to the fold mirror 112. Further in this embodiment, the fold mirror 112 is configured to receive the circularly polarized laser beam from the quarter wave plate 120. Furthermore, the dichroic beam splitter 114 is configured to receive the circularly polarized laser beam from the fold mirror 112 and direct it to the plurality of opposing mirrors 104.

Furthermore in operation, the opposing mirrors 104 are configured to direct the circularly polarized laser beam from the fiber optically coupled laser interface module 102 to a target. In one exemplary implementation, the tertiary mirror 116C is configured to receive the circularly polarized laser beam from the fiber optically coupled laser interface module 102. The secondary mirror 116B is then configured to receive the circularly polarized laser beam from the tertiary mirror 116C. The primary mirror 116A is then configured to receive the circularly polarized laser beam from the secondary mirror 116B and direct it to the target.

In addition, the opposing mirrors 104 are configured to direct the return laser beam from the target to the fiber optically coupled laser interface module 102. In one exemplary implementation, the primary mirror 116A is configured to receive the return laser beam from the target. The secondary mirror 116B is then configured to receive the return laser beam from the primary mirror 116A. The tertiary mirror 116C is then configured to receive the return laser beam from the secondary mirror 116B and direct it to the fiber optically coupled laser interface module 102.

Moreover, the fiber optically coupled laser interface module 102 is configured to transmit the return laser beam 108 to the receiver assembly 204 via the second fiber optic cable 210. In one exemplary implementation, the dichroic beam splitter 114 is configured to receive the return laser beam from the plurality of opposing mirrors 104 and direct it to the fold mirror 112. Particularly, the dichroic beam splitter 114 is configured to receive the return laser beam from the tertiary mirror 116C. In one embodiment, the dichroic beam splitter 114 is used for laser beam injection & extraction and allows the laser transmit beam to be injected into and extracted from the optical telescope without blocking or significantly attenuating the laser beam received by an imaging sensor. Further, the fold mirror 112 is configured to receive the return laser beam from the dichroic beam splitter 114 and direct it to the polarizing input/output device 110. For example, the fold mirror 112 is used for laser beam injection & extraction and is needed for packaging reasons. Furthermore, the polarizing input/output device 110 is configured to transmit the return laser beam 108 to the receiver assembly 204 via the second fiber optic cable 210.

In one embodiment, the quarter wave plate 120 is configured to receive the return laser beam from the fold mirror 112 and convert it to a linearly polarized return laser beam. For example, the quarter wave plate 120 is an optical element that modifies/manipulates the polarization characteristics of laser beam 106. The quarter wave plate 120 works in conjunction with the beam splitter cube 118 to perform the spatial separation of the laser transmit and received beams. Further, the beam splitter cube 118 is configured to receive the linearly polarized return laser beam from the quarter wave plate 120. In one exemplary implementation, the beam splitter cube 118 spatially separates the laser transmit and received beams based on their polarization characteristics. This technique results in excellent throughput minimal signal loss. Furthermore, the narrow band pass optical filter 122 is configured to receive the return laser beam from the beam splitter cube 118 and transmit the return laser beam 108 to the receiver assembly 204 via the second fiber optic cable 210. For example, the narrow band pass filter 122 suppresses the extraneous background optical signals from reaching the receiver assembly 204 and improves the overall performance of the LRF system 200. Also in operation, the receiver assembly 204 receives the return laser beam 108 from the fiber optically coupled laser interface module 102 via the second fiber optic cable 210 and process the return laser beam received from the target.

Figure 3:
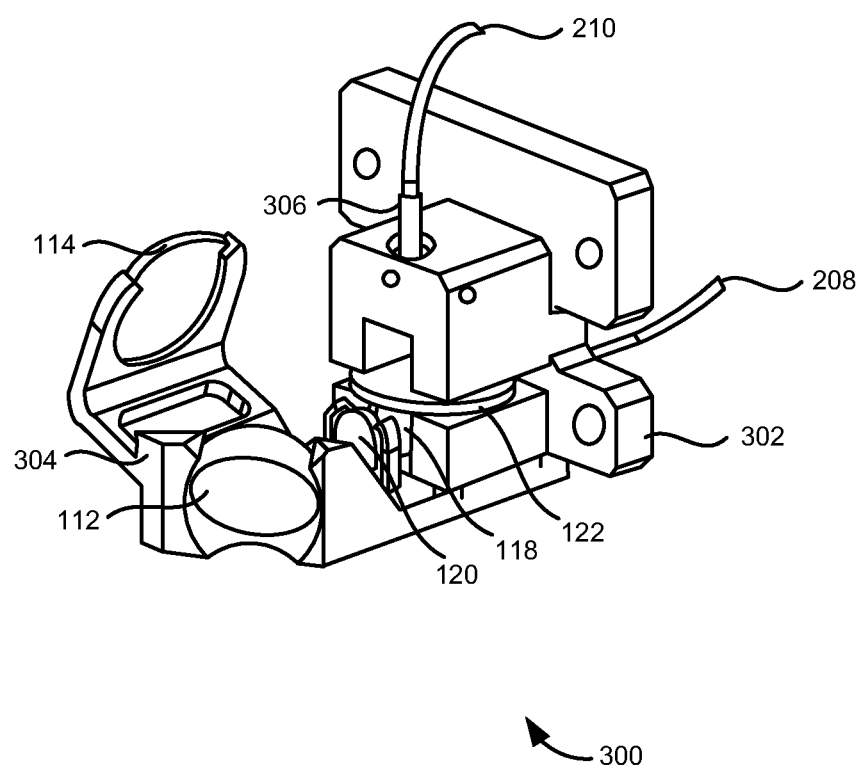
FIG. 3 illustrates a fiber optically coupled laser interface module, such as those shown in FIGS. 1 and 2, according to an embodiment of the present subject matter.

Referring now to FIG. 3, which illustrates a fiber optically coupled laser interface module 300, such as those shown in FIGS. 1 and 2, according to an embodiment of the present subject matter. As shown in the FIG. 3, the fiber optically coupled laser interface module 300 includes the first fiber optic cable 208, the second fiber optic cable 210, the fold mirror 112, the dichroic beam splitter 114, the beam splitter cube 118, the quarter wave plate 120, the narrow band pass filter 122, a LRF optical bench 302, a LRF optical mount 304, and a fiber optic cable miniature unit (MU) ferrule 306 aligned and epoxied into the LRF optical bench 302. This modular approach allows access to adjust the quarter wave plate 120 and easy connection of the first fiber optic cable 208 and the second fiber optic cable 210. The transmitter assembly and receiver assembly can be configured as mission specific elements to a common camera system. Multiple transmitter assemblies can be combined into a common fiber optic cable for specific tasks such as an eye safe LRF and high power laser designation. Further, the fiber optically coupled LRF 300 reduces size, weight, and heat from the telescope and optical structures and also allows replacement of LRF components without the disassembly of the camera and gimbal system.

In operation, the fiber optically coupled laser interface module 300 is configured to receive the laser beam from the first fiber optic cable 288 and transmit it to the target via the opposing mirrors. Further, the fiber optically coupled laser interface module 300 is configured to receive the return laser beam from the target via the opposing mirrors and transmit it to the receiver assembly via the second fiber optic cable 210. This is explained in more detail with reference to FIG. 2.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best. Explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended, to cover the application or implementation without departing from the spirit or scope of the claims of the present disclosure.

What is claimed is:

1. A fiber optically coupled laser rangefinder (LRF) for use in a gimbal system, comprising:
   a gimbal assembly, wherein the gimbal assembly comprises:
      a first fiber optic cable for receiving a laser beam from a transmitter assembly remotely located from the gimbal assembly;
      a fiber optically coupled laser interface module comprising:
         a beam splitter cube configured to receive the laser beam from the first fiber optic cable and linearly polarize the received laser beam;
         a quarter wave plate configured to receive the linearly polarized laser beam from the beam splitter cube and to convert the linearly polarized laser beam to a circularly polarized laser beam;
         a fold mirror configured to receive the circularly polarized laser beam from the quarter wave plate; and
         a dichroic beam splitter configured to receive the circularly polarized laser beam from the fold mirror;
      a plurality of opposing mirrors configured to direct the circularly polarized laser beam from the dichroic beam splitter to a target; and
      a second fiber optic cable for transmitting a return laser beam to a receiver assembly remotely located from the gimbal assembly, wherein the plurality of opposing mirrors are further configured to direct the return laser beam from the target to the fiber optically coupled laser interface module and wherein the fiber optically coupled laser interface module is further configured to transmit the return laser beam to the remote receiver assembly via the second fiber optic cable, and wherein the quarter wave plate and the beam splitter cube are configured to perform spatial separation of the laser beam and the return laser beam.

2. The fiber optically coupled LRF of claim 1, wherein the dichroic beam splitter is further configured to receive the return laser beam from the plurality of opposing mirrors and direct it to the fold mirror, wherein the fold mirror is further configured to receive the return laser beam from the dichroic beam splitter and direct it to the quarter wave plate, wherein the quarter wave plate is configured to receive the return laser beam from the fold mirror and wherein the beam splitter cube is configured to receive the return laser beam from the quarter wave plate.

3. The fiber optically coupled LRF of claim 2, wherein the fiber optically coupled laser interface module further comprises:
   a narrow band pass optical filter configured to receive the return laser beam from the beam splitter cube and transmit the return laser beam to the remote receiver assembly via the second fiber optic cable.

4. The fiber optically coupled LRF of claim 1, wherein the plurality of opposing mirrors comprise:
   a tertiary mirror configured to receive the circularly polarized laser beam from the fiber optically coupled laser interface module;
   a secondary mirror configured to receive the circularly polarized laser beam from the tertiary mirror; and
   a primary mirror configured to receive the circularly polarized laser beam from the secondary mirror and direct the laser beam to the target.

5. The fiber optically coupled LRF of claim 4, wherein the primary mirror is further configured to receive the return laser beam from the target, wherein the secondary mirror is further configured to receive the return laser beam from the primary mirror, and wherein the tertiary mirror is further configured to receive the return laser beam from the secondary mirror and direct it to the fiber optically coupled laser interface module.

6. The fiber optically coupled LRF of claim 1, wherein the first fiber optic cable is a 11 micrometer (μm) fiber optic cable.

7. The fiber optically coupled LRF of claim 1, wherein the second fiber optic cable is a 62 μm fiber optic cable.

8. The fiber optically coupled LRF of claim 1, wherein the remote transmitter assembly produces the laser beam and directs the produced laser beam to the fiber optically coupled laser interface module via the first fiber optic cable and wherein the remote receiver assembly receives the return laser beam from the fiber optically coupled laser interface module via the second fiber optic cable and process the return laser beam received from the target.

9. A laser rangefinder (LRF) system, comprising:
   a gimbal assembly;
   a remote transmitter assembly remotely located from the gimbal assembly; and
   a remote receiver assembly remotely located from the gimbal assembly, wherein the gimbal assembly comprises:
      a first fiber optic cable for receiving a laser beam from the remote transmitter assembly;
      a fiber optically coupled laser interface module comprising:
         a beam splitter cube configured to receive the laser beam from the first fiber optic cable and linearly polarize the received laser beam;
         a quarter wave plate configured to receive the linearly polarized laser beam from the beam splitter cube and to convert the linearly polarized laser beam to a circularly polarized laser beam;
         a fold mirror configured to receive the circularly polarized laser beam from the quart wave plate; and
         a dichroic beam splitter configured to receive the circularly polarized laser beam from the fold mirror;
      a plurality of opposing mirrors configured to direct the circularly polarized laser beam from the dichroic beam splitter to a target; and
      a second fiber optic cable for transmitting a return laser beam to the remote receiver assembly, wherein the plurality of opposing mirrors are further configured to direct the return laser beam from the target to the fiber optically coupled laser interface module and wherein the fiber optically coupled laser interface module is further configured to transmit the return laser beam to the remote receiver assembly via the second fiber optic cable, and wherein the quarter wave plate and the beam splitter cube are configured to perform spatial separation of the laser beam and the return laser beam.

10. The system of claim 9, wherein the dichroic beam splitter is further configured to receive the return laser beam from the plurality of opposing mirrors and direct it to the fold mirror, wherein the fold mirror is further configured to receive the return laser beam from the dichroic beam splitter and direct it to the quarter wave plate, wherein the quarter wave plate is configured to receive the return laser beam from the fold mirror and wherein the beam splitter cube is configured to receive the return laser beam from the quarter wave plate.

11. The system of claim 10, wherein the fiber optically coupled laser interface module further comprises:
a narrow band pass optical filter configured to receive the return laser beam from the beam splitter cube and transmit the return laser beam to the remote receiver assembly via the second fiber optic cable.

12. The system of claim 9, wherein the plurality of opposing mirrors comprise:
a tertiary mirror configured to receive the circularly polarized laser beam from the fiber optically coupled laser interface module;
a secondary mirror configured to receive the circularly polarized laser beam from the tertiary mirror; and
a primary mirror configured to receive the circularly polarized laser beam from the secondary mirror and direct the laser beam to the target.

13. The system of claim 12, wherein the primary mirror is further configured to receive the return laser beam from the target, wherein the secondary mirror is further configured to receive the return laser beam from the primary mirror, and wherein the tertiary mirror is further configured to receive the return laser beam from the secondary mirror and direct it to the fiber optically coupled laser interface module.

\* \* \* \* \*